US008684281B2

(12) United States Patent
Micheli et al.

(10) Patent No.: US 8,684,281 B2
(45) Date of Patent: Apr. 1, 2014

(54) SPRAY DEVICE HAVING REMOVABLE HARD COATED TIP

(75) Inventors: Paul R. Micheli, Glen Ellyn, IL (US); Christine Laub, Carol Stream, IL (US); Al Suopys, Lindenhurst, IL (US); Michael Starozhitsky, Long Grove, IL (US)

(73) Assignee: Finishing Brands Holdings Inc., Minneapolis, MN (US)

( * ) Notice: Subject to any disclaimer, the term of this patent is extended or adjusted under 35 U.S.C. 154(b) by 726 days.

(21) Appl. No.: 11/389,450

(22) Filed: Mar. 24, 2006

(65) Prior Publication Data

US 2007/0221762 A1 Sep. 27, 2007

(51) Int. Cl.
*A01G 25/09* (2006.01)
*B05B 17/00* (2006.01)

(52) U.S. Cl.
USPC ............... 239/1; 239/601; 239/599; 239/597; 29/890.143

(58) Field of Classification Search
USPC .................. 239/589, 597, 599, 601, DIG. 19; 29/890.143; 451/102
See application file for complete search history.

(56) References Cited

U.S. PATENT DOCUMENTS

| | | | | |
|---|---|---|---|---|
| 1,650,128 | A | | 11/1927 | Hubbard |
| 1,741,169 | A | | 12/1929 | Thompson |
| 2,246,211 | A | | 6/1941 | Kilich |
| 2,303,280 | A | | 11/1942 | Jenkins |
| 2,307,014 | A | | 1/1943 | Becker et al. |
| 2,595,759 | A | | 5/1952 | Buckland et al. |
| 2,621,078 | A | | 12/1952 | Wahlin |
| 2,895,685 | A | | 7/1959 | Peeps |
| 3,032,277 | A | | 5/1962 | Petty |
| 3,190,564 | A | | 6/1965 | Liedberg |
| 3,521,824 | A | | 7/1970 | Wilcox |
| 3,734,406 | A | | 5/1973 | Runstadler et al. |
| 3,746,253 | A | | 7/1973 | Walberg |
| 3,747,851 | A | | 7/1973 | Conrad |
| 3,865,314 | A | | 2/1975 | Levey et al. |
| 3,946,947 | A | | 3/1976 | Schneider |
| 4,097,000 | A | * | 6/1978 | Derr .............................. 239/599 |
| 4,159,082 | A | | 6/1979 | Luderer et al. |
| 4,174,593 | A | | 11/1979 | Maeda |
| 4,185,484 | A | | 1/1980 | Abramsen |
| 4,258,885 | A | * | 3/1981 | Legeza .......................... 239/707 |

(Continued)

FOREIGN PATENT DOCUMENTS

| | | |
|---|---|---|
| DE | 25 22 885 | 12/1976 |
| DE | 3527923 | 2/1987 |

(Continued)

OTHER PUBLICATIONS

Spanogle et al.; Development of an Impinging-Jet Fuel-Injection Valve Nozzle; Langley Memorial Aeronautical Laboratory, National Advisory Committee for Aeronautics; Technical Note No. 372,1931.

*Primary Examiner* — Dinh Q Nguyen
(74) *Attorney, Agent, or Firm* — Fletcher Yoder P.C.

(57) ABSTRACT

In accordance with certain embodiments, a spray system is provided with a spray tip including a core tip structure having a first material, wherein the core tip structure includes a liquid passage extending to a liquid exit orifice. The spray tip also includes a wear resistant coating disposed about the core tip structure, wherein the wear resistant coating has a second material relatively harder than the first material.

25 Claims, 4 Drawing Sheets

(56) References Cited

U.S. PATENT DOCUMENTS

| | | | | | |
|---|---|---|---|---|---|
| 4,330,086 | A | | 5/1982 | Nysted | |
| 4,349,947 | A | | 9/1982 | Rood | |
| 4,392,362 | A | | 7/1983 | Little | |
| 4,520,962 | A | | 6/1985 | Momono et al. | |
| 4,632,314 | A | | 12/1986 | Smith et al. | |
| 4,645,127 | A | * | 2/1987 | Emory et al. | 239/299 |
| 4,646,968 | A | | 3/1987 | Sablatura | |
| 4,679,359 | A | | 7/1987 | Suzuki | |
| 4,899,937 | A | | 2/1990 | Haruch | |
| 5,035,358 | A | | 7/1991 | Katsuno et al. | |
| 5,072,883 | A | | 12/1991 | Vidusek | |
| 5,074,466 | A | | 12/1991 | Santiago | |
| 5,143,302 | A | * | 9/1992 | Sakuma | 239/599 |
| 5,170,941 | A | | 12/1992 | Morita et al. | |
| 5,180,104 | A | | 1/1993 | Mullette | |
| 5,209,405 | A | | 5/1993 | Robinson et al. | |
| 5,249,746 | A | | 10/1993 | Kaneko et al. | |
| 5,251,468 | A | | 10/1993 | Lin et al. | |
| 5,273,059 | A | | 12/1993 | Gross et al. | |
| 5,288,027 | A | * | 2/1994 | Herstek et al. | 239/594 |
| 5,308,404 | A | | 5/1994 | Yam et al. | |
| 5,319,568 | A | | 6/1994 | Bezaire | |
| 5,322,532 | A | | 6/1994 | Kurtz | |
| 5,344,078 | A | | 9/1994 | Fritz et al. | |
| 5,344,494 | A | | 9/1994 | Davidson et al. | |
| 5,376,157 | A | | 12/1994 | Yam et al. | |
| 5,419,491 | A | | 5/1995 | Breitsprecher | |
| 5,494,226 | A | * | 2/1996 | Herstek et al. | 239/591 |
| 5,508,206 | A | | 4/1996 | Glenn et al. | |
| 5,531,634 | A | | 7/1996 | Schott | |
| 5,553,784 | A | | 9/1996 | Theurer | |
| 5,558,562 | A | | 9/1996 | Diat | |
| 5,607,480 | A | | 3/1997 | Beaty | |
| 5,642,860 | A | * | 7/1997 | Bush et al. | 239/333 |
| 5,685,482 | A | | 11/1997 | Sickles | |
| 5,699,967 | A | | 12/1997 | Conatser et al. | |
| 5,709,587 | A | | 1/1998 | Shaffer | |
| 5,816,811 | A | | 10/1998 | Beaty | |
| 5,865,902 | A | | 2/1999 | Yam et al. | |
| 5,955,119 | A | * | 9/1999 | Andris et al. | 425/461 |
| 6,021,962 | A | | 2/2000 | Hedger | |
| 6,023,324 | A | | 2/2000 | Myers | |
| 6,045,057 | A | | 4/2000 | Moor et al. | |
| 6,085,996 | A | | 7/2000 | Culbertson et al. | |
| 6,129,295 | A | | 10/2000 | Johansson | |
| 6,142,388 | A | | 11/2000 | Schwab | |
| 6,161,778 | A | | 12/2000 | Haruch | |
| 6,186,273 | B1 | | 2/2001 | Goldbach et al. | |
| 6,189,214 | B1 | | 2/2001 | Skeath et al. | |
| 6,289,676 | B1 | | 9/2001 | Prociw et al. | |
| 6,347,984 | B1 | | 2/2002 | Groman | |
| 6,398,628 | B1 | | 6/2002 | Groman | |
| 6,450,422 | B1 | | 9/2002 | Maggio | |
| 6,669,112 | B2 | | 12/2003 | Reetz, III et al. | |
| 6,669,115 | B2 | | 12/2003 | Sun et al. | |
| 6,808,122 | B2 | | 10/2004 | Micheli | |
| 6,817,550 | B2 | * | 11/2004 | Taylor et al. | 239/591 |
| 6,817,927 | B2 | | 11/2004 | Smith et al. | |
| 6,848,973 | B2 | | 2/2005 | Bellemare | |
| 6,854,169 | B2 | | 2/2005 | Love, III et al. | |
| 6,935,577 | B2 | | 8/2005 | Strong | |
| 2003/0066905 | A1 | | 4/2003 | Huffman | |
| 2003/0164250 | A1 | | 9/2003 | Wardley | |
| 2004/0046040 | A1 | | 3/2004 | Micheli | |
| 2004/0195369 | A1 | | 10/2004 | Strong | |
| 2005/0194472 | A1 | | 9/2005 | Geser et al. | |
| 2006/0010750 | A1 | * | 1/2006 | Yoshitaka | 42/79 |
| 2006/0016914 | A1 | * | 1/2006 | Bach et al. | 239/533.1 |
| 2008/0017734 | A1 | | 1/2008 | Micheli et al. | |

FOREIGN PATENT DOCUMENTS

| | | | |
|---|---|---|---|
| DE | 9017721 | | 11/1991 |
| DE | 3624271 | | 1/1998 |
| EP | 0430858 | | 6/1991 |
| EP | 0 630 690 | | 12/1994 |
| EP | 1 108 476 | | 6/2001 |
| EP | 1 391 246 | | 2/2004 |
| GB | 280500 | | 9/1928 |
| GB | 1204183 | | 9/1970 |
| GB | 2085759 | | 5/1982 |
| JP | 57153540 | U | 9/1982 |
| JP | 2015592 | Y2 | 4/1990 |
| JP | 2505783 | Y2 | 7/1996 |
| TW | 545486 | | 8/2003 |
| TW | 200414931 | | 8/2004 |
| WO | WO0179650 | | 10/2001 |
| WO | WO2005065836 | | 7/2005 |

* cited by examiner

FIG. 4
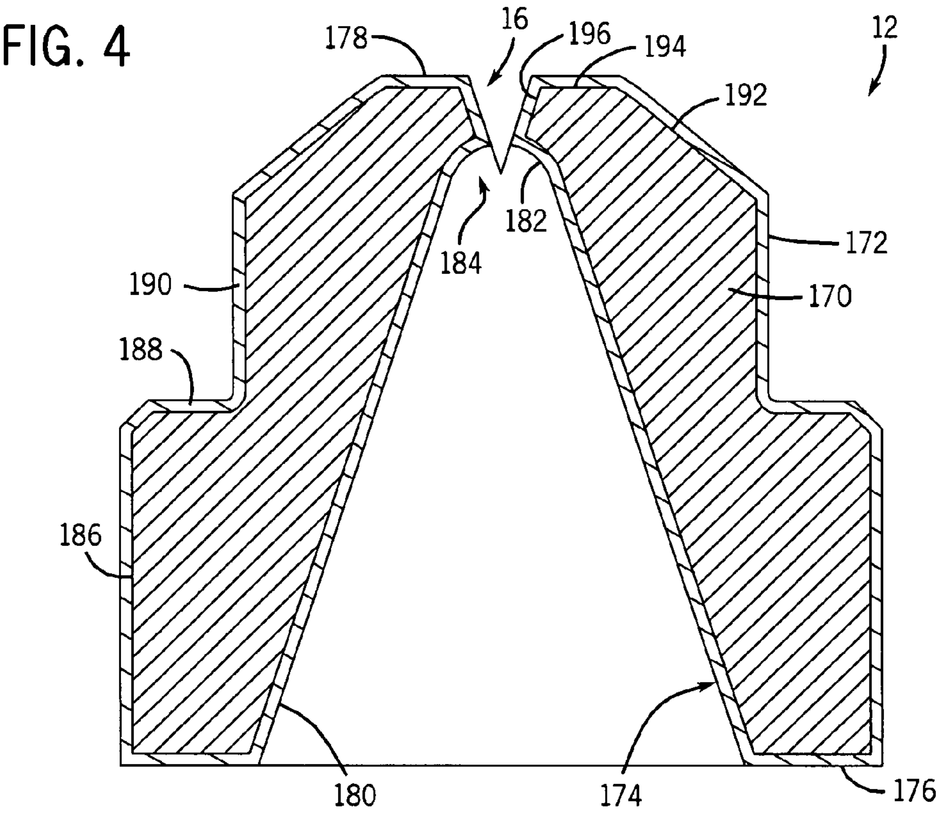
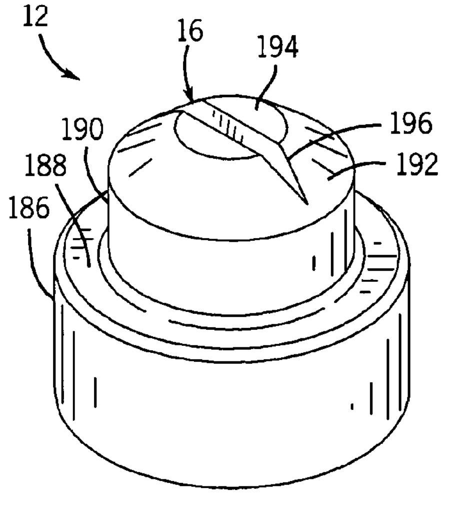
FIG. 5
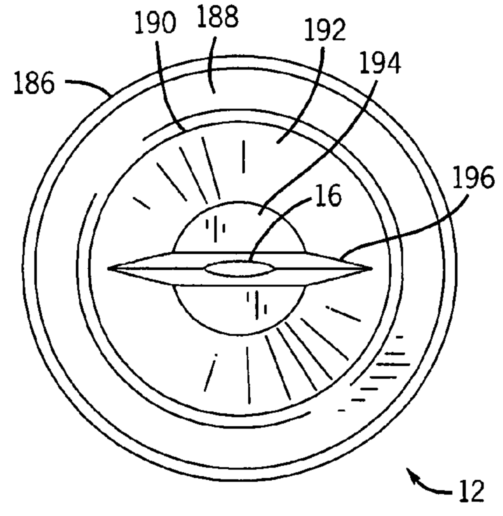
FIG. 6

SPRAY DEVICE HAVING REMOVABLE HARD COATED TIP

FIELD OF THE INVENTION

The invention relates generally to spray devices and, more particularly, to spray tips of spray guns used in spray coating systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Spray devices, such as spray guns, generally include a number of consumable wear items, which eventually erode due to contact with liquid passing through passages and orifices of the spray device. For example, in paint spraying applications, the liquid exit orifice in spray tips of spray coating guns eventually erodes from contact with the liquid paint at high pressures. Accordingly, the spray tips are typically cast from tungsten carbide to provide wear resistance. Unfortunately, tungsten carbide is relatively expensive and is difficult to cast and machine into the desired geometry, passages, orifices, and so forth.

For example, the process of casting the tungsten carbide into the initial form of the spray tips results in relatively large internal bores for the subsequent machining and processing. Unfortunately, these large internal bores define a large volume, which tends to retain the liquid paint within the spray tip after operation of the spray coating gun. This retention of paint within the spray tip causes the spray coating gun to drip or dribble after operation.

By further example, the hardness of tungsten carbide complicates the process of making the liquid exit orifice in the spray tips. The hardness of tungsten carbide generally precludes the use of some manufacturing techniques, while making it difficult to achieve the desired shape with other manufacturing techniques. Specifically, the hardness of tungsten carbide rapidly wears many manufacturing tools, such as grinding wheels, thereby increasing costs and time associated with replacing the worn tools. Often, the desired shape of the liquid exit orifice cannot be achieved with tungsten carbide, which can lead to reduced performance and undesirable spray characteristics from the spray tip.

For these reasons, a technique is needed to reduce costs, provide wear resistance, reduce undesirable liquid retention and drip, and improve performance of spray tips used in spray devices.

BRIEF DESCRIPTION

In accordance with certain embodiments, a spray system is provided with a spray tip including a core tip structure having a first material, wherein the core tip structure includes a liquid passage extending to a liquid exit orifice. The spray tip also includes a wear resistant coating disposed about the core tip structure, wherein the wear resistant coating has a second material relatively harder than the first material.

DRAWINGS

These and other features, aspects, and advantages of the present invention will become better understood when the following detailed description is read with reference to the accompanying drawings in which like characters represent like parts throughout the drawings, wherein:

FIG. 4 is a cross-sectional side view of an alternative hard coated spray tip having a truncated end and a streamlined interior passage in accordance with certain embodiments of the present technique;

FIG. 5 is a perspective view of the alternative hard coated spray tip as illustrated in FIG. 4; and FIG. 6 is a top view of the hard coated spray tip as illustrated in FIGS. 4 and 5.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
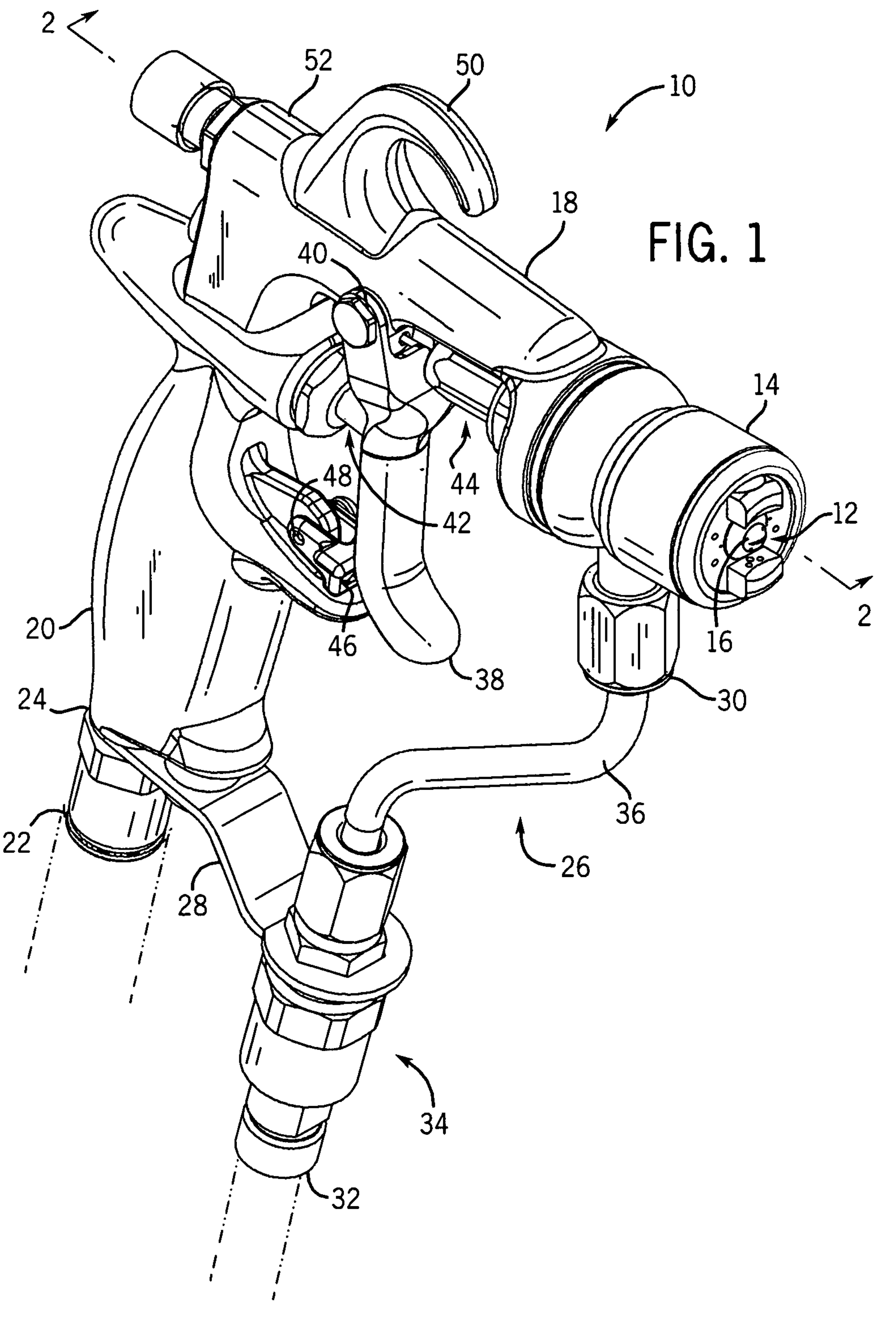
FIG. 1 is a perspective view of an exemplary spray device having a hard coated spray tip in accordance with certain embodiments of the present technique.

FIG. 1 is a perspective view of an exemplary spray device 10 having a hard coated spray tip 12 disposed within a head assembly 14 in accordance with certain embodiments of the present technique. In certain embodiments, the spray device 10 is an airless spray coating gun or an air-assisted spray coating gun, which generally atomize the liquid without air atomization mechanisms. However, an air-assisted spray coating gun may include air jets configured to shape the liquid spray in the desired pattern, e.g., flat, conical, hollow, and so forth. In other embodiments, the spray device 10 may be an air atomization spray gun, which includes one or more air jets configured to atomize the liquid. The air atomization spray gun also may include one or more spray shaping jets as mentioned above.

As discussed in further detail below, the hard coated spray tip 12 includes a core tip structure made of a first material and a coating of a second material disposed about the core tip structure, wherein the second material is relatively harder than the first material. Thus, the relatively softer first material of the core tip structure reduces time, costs, and complexities associated with casting, machining, and other manufacturing processes. As a result, the softer first material is more easily and effectively made into the desired internal and external dimensions, shapes, recesses, orifices, passages, and general geometry of the core tip structure. For example, wire electrical discharge machining (EDM) may be used to create one or more orifices, such as a cat-eye orifice 16, in the core tip structure. Subsequently, the core tip structure is hardened with the coating of the second material. For example, the coating of the second material may be applied with chemical vapor deposition (CVD), physical vapor deposition (PVD), or plating, or thermal diffusion, or boronizing, or combinations thereof.

As further illustrated in FIG. 1, the head assembly 14 is coupled to a body assembly 18 of the spray device 10. The illustrated body assembly 18 includes a handle 20 and an air supply coupling 22 disposed at a base 24 of the handle 20. The body assembly 18 also includes a liquid supply assembly 26 coupled to the base 24 of the handle 20 via a bracket 28. The liquid supply assembly 26 is further coupled to the head assembly 14 via a liquid head coupling 30. The illustrated liquid supply assembly 26 includes a liquid supply coupling 32, a liquid filter assembly 34, and a liquid conduit 36 leading to the liquid head coupling 30. The body assembly 18 also includes a trigger 38 rotatably coupled to a pivot joint 40. In turn, the trigger 38 is movably coupled to an air valve assembly 42 and a liquid valve assembly 44, such that the trigger simultaneously controls the passage of air and liquid through the spray device 10. In addition, the body assembly 18 includes a trigger lock 46 rotatably coupled to a pivot joint 48 in close proximity to the trigger 38. The trigger lock 46 enables a user to lock or unlock the trigger 38 and, as a result, the associated air and liquid valve assemblies 42 and 44. The illustrated body assembly 18 also includes a hanging support or hook 50 disposed along a top 52 of the spray device 10.

In certain embodiments, the spray device 10 may further include air and liquid conduits leading to the air and liquid supply couplings 22 and 32. In an exemplary spray system, a plurality of the spray devices 10 may be coupled to one or more positioning systems, control units, user interfaces, computers, and so forth. For example, an exemplary positioning system may include one or more robotic arms, overhead rail structures having moving supports, or combinations thereof. In some applications, the spray guns 10 may be coordinated with one another to perform a desired spraying operation, such as spraying a plurality of automobiles in an assembly line. The spraying system also may include associated systems and devices, such as infrared heaters or other curing devices configured to cure a spray coating.

Figure 2:
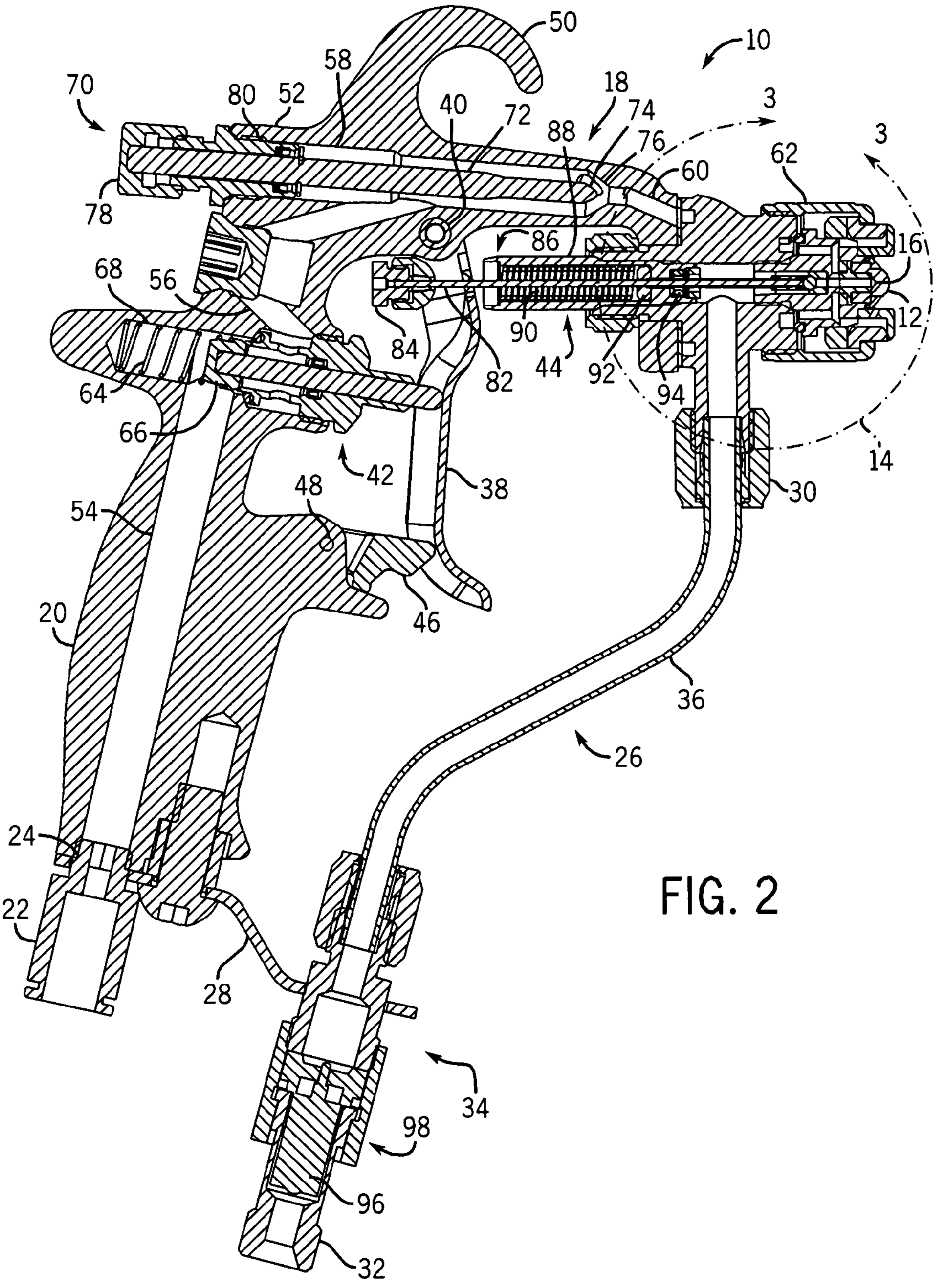
FIG. 2 is a cross-sectional side view of the spray device as illustrated in FIG. 2, further illustrating internal components and passages leading to the hard coated spray tip.

FIG. 2 is a cross-sectional view of the spray device 10 as illustrated in FIG. 1, further illustrating internal components and flow passages through the head and body assemblies 14 and 18 in accordance with certain embodiments of the present technique. As illustrated, the body assembly 18 includes a series of air passages 54, 56, 58, and 60 leading from the air supply coupling 22 to an air nozzle assembly 62 of the head assembly 14. The air valve assembly 42 is disposed between the air passages 54 and 56 to control the passage of air via operation of the trigger 38. As illustrated, the air valve assembly 42 includes a spring 64 disposed adjacent a moveable valve member 66, which move linearly along a valve channel 68 as the trigger 38 rotates about the pivot joint 40.

Downstream from the air valve assembly 42, a pressure or flow control assembly 70 is disposed along the air passage 58. The pressure or flow control assembly 70 includes an adjustment valve 72 having a wedge-shaped valve tip 74 disposed near a wedged portion 76 of the air passage 58. The pressure or flow control assembly 70 also includes an adjustment head 78 coupled to the adjustment valve 72 and rotatably coupled to the body assembly 18 via threads 80. Accordingly, the adjustment head 78 may be rotated to change the linear distance or proximity of the wedge-shaped valve tip 74 relative to the wedged portion 76 of the air passage 58. In this manner, the pressure or flow control assembly 78 can adjust the rate or pressure of air flow to the air nozzle assembly 62.

In addition to airflow, the trigger 38 rotates about the pivot joint 40 to open and close the liquid valve assembly 44, which extends through the head assembly 14 to the hard coated spray tip 12. In the illustrated embodiment, the liquid valve assembly 44 includes a valve shaft 82 coupled to the trigger 38 via a fastener 84. The liquid valve assembly 44 also includes a needle packing cartridge assembly 86 disposed about the valve shaft 82 and threadingly coupled to the head assembly 14. The illustrated needle packing cartridge assembly 86 includes a cylindrical casing 88 and an internal coil spring 90 disposed about the valve shaft 82. The needle packing cartridge assembly 86 also includes one or more seals, such as o-ring seals 92 and 94.

In operation, as the trigger 38 rotates clockwise about the pivot joint 40, the valve shaft 82 is biased linearly to the left to an open position that enables the passage of liquid from the liquid supply assembly 26 to the hard coated spray tip 12. As discussed above, the liquid supply assembly 26 includes a liquid filter assembly 34. In the illustrated embodiment, the liquid filter assembly 34 includes a filter 96, such as a mesh filter cartridge, disposed within a filter housing 98 between the liquid supply coupling 32 and the liquid conduit 36. However, a variety of filter mechanisms may be disposed inside the filter housing 98. As the liquid passes through the spray device 10, the hard coated spray tip 12 provides resistance against erosion by the liquid, e.g., paint or another liquid coating material. In certain embodiments, the liquid may include particulate matter, such that a two-phase flow of liquid and solid passes through the spray device 10 and the hard coated spray tip 12. For example, certain embodiments of paint may be described as particulate paint, which includes both liquid and solid particles. Accordingly, the filter 96 is configured to remove larger particles from the liquid, while the hard coating of the spray tip 12 provides resistance against wear by the passing liquid (and any remaining particles).

Figure 3:
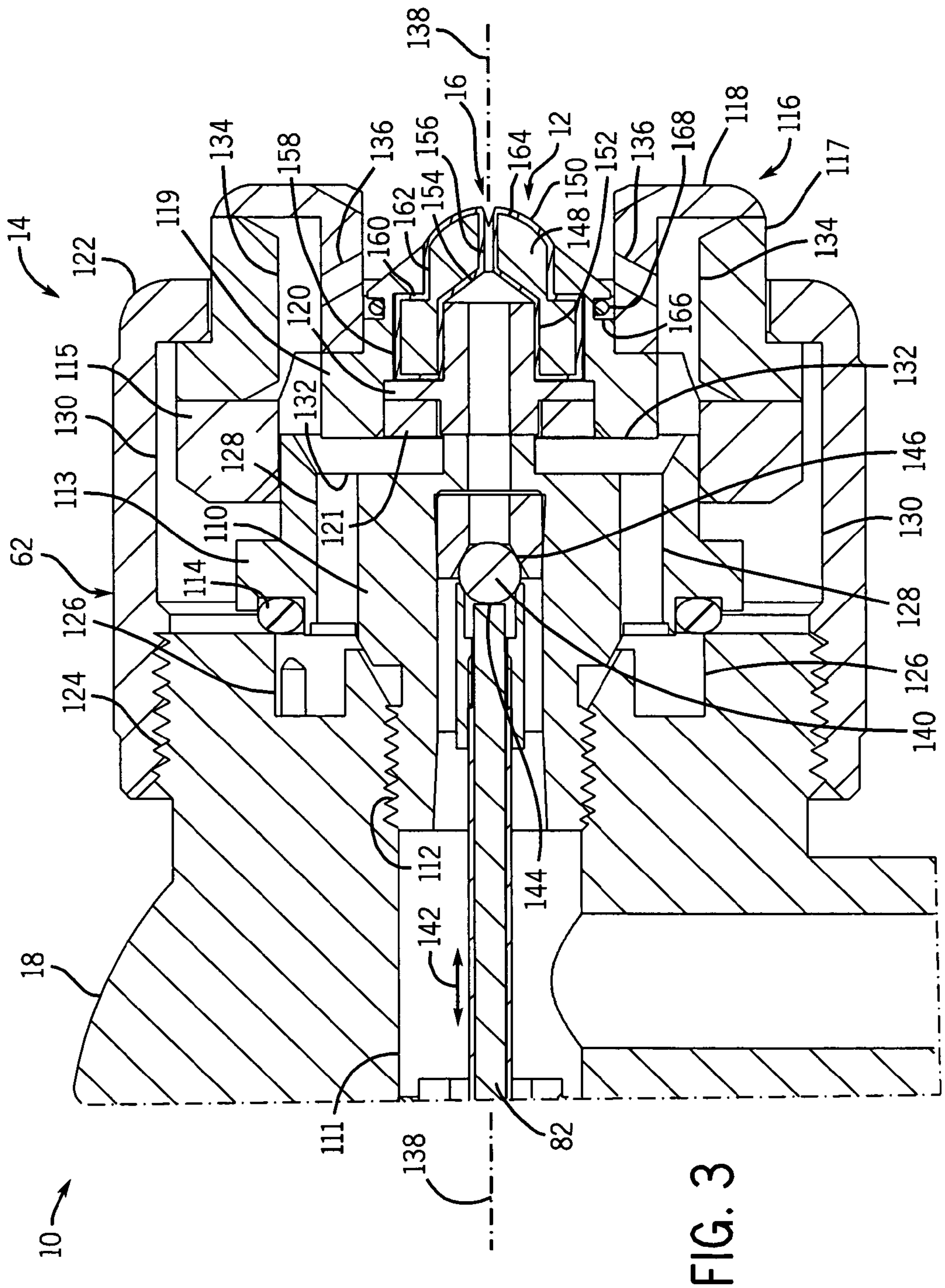
FIG. 3 is a partial cross-sectional view of the spray device as illustrated in FIGS. 1 and 2, further illustrating details of the hard coated spray tip.

FIG. 3 is a partial cross-sectional view of the spray device 10 as illustrated in FIGS. 1 and 2, further illustrating details of the head assembly 14 in accordance with certain embodiments of the present technique. In the illustrated embodiment, the air nozzle assembly 62 includes a first annular member 110 threadingly coupled to a central liquid passage 111 via threads 112. The air nozzle assembly 62 also includes a second annular member 113 disposed concentrically about the first annular member 110 and sealed against the body assembly 18 via an o-ring 114. The air nozzle assembly 62 further includes a third annular member 115 disposed concentrically about the second annular member 113, and an air-assisted spray shaping head assembly 116 disposed adjacent the third annular member 115. In certain embodiments, the air-assisted spray shaping head assembly 116 includes one or more fourth annular members, e.g., two concentric members 117 and 118. The air nozzle assembly 62 also may include one or more adapters, bushings, washers, or other structures between the head assembly 116 and the hard coated spray tip 12. For example, the illustrated embodiment includes an outer holder 119 disposed about the hard coated spray tip 12, an inner bushing or adapter 120 disposed at least partially into the hard coated spray tip 12, and a rear washer 121 disposed against a rear side of the adapter 120 flush with a rear side of the outer holder 119. Finally, the air nozzle assembly 62 includes an outer casing or retainer 122 disposed about the members 110, 113, 115, 116, 119, 120, and 121 and threadingly coupled to the body assembly 18 via threads 124.

The illustrated members 110, 113, 115, 116, 119, 120, 121, and 122 define or include a plurality of air passages 126, 128, 130, 132, and 134 leading from the air passage 60 in the body assembly 18 to one or more air jets 136 disposed in the air-assisted spray shaping head 116. In the illustrated embodiment, a plurality of these air jets 136 are angled toward a center line or center plane 138 of the hard coated spray tip 12. In operation, the air jets 136 provide air flow or pressure to shape the liquid spray that develops downstream of the cat-eye orifice 16. For example, the air jets 136 may be configured to shape the spray in a generally flat or sheet-like pattern. However, the illustrated embodiment does not include air atomization jets, but rather the spray is formed substantially by liquid atomization from the cat-eye orifice 16 of the hard coated spray tip 12. In alternative embodiments, the spray device 10 may include one or more air atomization jets to cooperate with the hard coated spray tip 12, thereby creating a desired spray via both liquid atomization and air atomization.

In operation, the valve shaft 82 moves linearly along the axis 136 to open and close a ball valve member 140 as indicated by arrow 142. Specifically, the ball valve member 140 is disposed between an end 144 of the valve shaft 82 and a wedge-shaped cavity or passage 146 within the first annular member 110 of the air nozzle assembly 62. Accordingly, the flow of liquid through the head assembly 14 to the hard coated spray tip 12 is controlled by biasing or releasing the ball valve member 140 relative to the wedge-shaped cavity or passage 146. In other embodiments, the end 144 of the valve shaft 82 may have a wedge-shaped tip (e.g., a needle valve), which can be removably biased against the wedge-shaped cavity or passage 146 to open and close the flow of liquid through the head assembly 14.

In the embodiment of FIG. 3, the hard coated spray tip 12 includes a core tip structure 148 made of a first material and a hard coating 150 of a second material disposed about the core tip structure 148, wherein the second material is relatively harder than the first material. For example, the first material of the core tip structure 148 may include one or more tool steels, or another material, or combinations thereof. More specifically, exemplary tool steels include a type A tool steel, or a type D tool steel, or a type H tool steel, or a type M tool steel, or a type S tool steel, or combinations thereof. By further example, the second material of the hard coating 150 may include chrome, titanium alloys, or other relatively harder materials than the first material, or combinations thereof. Some embodiments of the hard coating 150 may include a plurality of layers of hard materials. For example, the hard coating 150 may include a first coating layer, a second coating layer, a third coating layer, and so forth. These coating layers may have different material compositions and properties. For example, one or more of the layers may provide resistance to wear, while others may provide resistance to chemical attack of the underlying first material of the core tip structure 148. One exemplary arrangement of hard coating layers includes one or more inner chemically resistant layers covered by one or more outer wear resistant layers.

In one specific embodiment, the first material includes a D2 tool steel and the second material includes titanium nitride. An exemplary D2 tool steel may include about 1.4 to 1.6% carbon, about 0 to 0.6% manganese, about 0 to 0.6% silicon, about 11-13% chromium, about 0 to 0.3% nickel, about 0.7 to 1.2% molybdenum, and about 0 to 1.1% vanadium.

Accordingly, the relatively softer nature of the first material enables ease of manufacturing of the core tip structure 148 followed by hardening via the second material of the hard coating 150. For example, certain embodiments of the core tip structure 148 are manufactured by molding, casting, machining, drilling, grinding, wire electrical discharge machining (EDM), or combinations thereof. Subsequently, the hard coating 150 may be applied via plating, or thermal diffusion, or boronizing, or chemical vapor deposition (CVD), or physical vapor deposition (PVD), or combinations thereof. In one specific embodiment, the core tip structure 148 is fabricated from a tool steel (e.g., D2 tool steel) and the cat-eye orifice is created by wire electrical discharge machining (EDM), while the hard coating 150 is applied by chemical vapor deposition (CVD) of titanium oxide.

The internal geometry of the illustrated core tip structure 148 has a first cylindrical passage 152, a converging passage 154, and a second cylindrical passage 156 leading to the cat-eye orifice 16. The external geometry of the illustrated core tip structure 148 includes a first cylindrical portion 158, a step portion 160 leading to a second cylindrical portion 162, and a semi-spherical or convex face 164. However, the internal and external geometries of the core tip structure 148 may be adapted to any particular spray device 10. In addition, the internal and external geometries may be modified to reduce cost, improve the spray performance, and reduce liquid retention.

In other embodiments, the hard coated spray tip 12 and one or more sets of the members 110, 113, 115, 116, 119, 120, and 121, or combinations thereof may be integrally formed as a single piece or structure, wherein the single piece or structure has a solid core and an external hard coating. For example, the solid core may be similar to the core tip structure 148 and the hard coating may be similar to the hard coating 150 as described in detail above. The integration of parts into a single piece or structure decreases the number of parts, complexity, and costs associated with manufacturing the spray device 10. The use of a solid core of a relatively softer material than the external hard coating also enables ease of manufacture of the integrated components, e.g., 12, 119, 120, 121, or combinations thereof. The use of the external hard coating further ensures that the integrated components are resistive to wear, thereby increasing the useful life of the integrated components. In turn, the increased useful life decreases costs and downtime associated with replacing the components. Otherwise, without an external hard coating, it may not be desirable to integrate high wear components with low wear components, because the integrated component would eventually wear and be replaced at a potentially higher cost associated with the integrated components. In other words, without an external hard coating, some of the individual components may be subject to more wear and replacement than others. Thus, without an external hard coating, it may be more desirable to separate high wear regions/components from relatively low and/or medium wear regions/components, thereby allowing separate replacement of the high wear regions/components. Again, the application of the external hard coating increases the wear resistance to reduce the likelihood of costly replacements and repairs of the integrated components. Thus, instead of providing numerous components subject to varying levels of wear as fluid passes through the spray device 10, the spray device 10 may integrate one or more sets of components into one or more integrated structures having an external hard coating.

In one specific embodiment, the outer holder 119 and the hard coated spray tip 12 are integrally formed as one piece with generally the same dimensions as the two components 119 and 12 combined, wherein the one piece structure has a solid core and a hard coating disposed about the inner and outer surfaces of the solid core. In this particular embodiment, the adapter 120 and the rear washer 121 also may be combined as a single structure, for example, a nylon structure having generally the same dimensions as the two components 120 and 121 combined. In alternative embodiments, the adapter 120 and the rear washer 121 may be eliminated by extending the length of the hard coated spray tip 12, such that the rear side of the spray tip 12 is generally flush with the rear side of the outer holder 119. The outer holder 119, or the combination of the outer holder 119 with the spray tip 12, also may include an outer annular groove 166. A retaining clip or seal 168 may be disposed in the outer annular groove 166, thereby providing a retention force or seal against the head 116. In some embodiments, the spray tip 12 may be combined with one or more components having air passages, orifices, jets, and so forth. For example, the spray tip 12 may be combined with the outer holder 119 and one or components of the air assisted spray shaping head 116, for example, the concentric members 117 and/or 118. In this particular embodiment, the integrated spray tip 12 and air assisted spray shaping head 116 includes both air and fluid passages for air-assisted fluid atomization in a single structure. In other embodiments, the spray tip 12 may be combined with one or more components of a valve assembly, e.g., first annular member 110, another annular member having the wedge-shaped cavity or passage 146 within the first annular member 110, or a combination thereof. In this particular embodiment, the spray tip 12 also may be combined with the members 119, 120, and 121, or a combination thereof. Again, the core structure and hard coating technique may be applied to a variety of spray tips, or combinations of spray tips and adjacent components, or modified spray tips having streamlined features.

FIGS. 4-6 illustrate an alternative embodiment of the hard coated spray tip 12, wherein the internal and external geometries are modified to improve spray performance, reduce liquid retention, and so forth. Turning first to FIG. 4, this figure illustrates a cross-sectional side view of the alternative hard coated spray tip 12 in accordance with certain embodiments of the present technique. The hard coated spray tip 12 of FIG. 4 includes a core tip structure 170 made of a first material and a hard coating 172 made of a second material, wherein the second material is substantially harder than the first material as discussed in detail above with reference to FIG. 3. The various embodiments of first and second materials and manufacturing processes described above with reference to FIGS. 1-3 are applicable to the embodiment of FIGS. 4-6.

In contrast to the embodiment of FIG. 3, the modified core tip structure 170 of FIG. 4 includes a streamlined interior passage 174 leading from an inlet side 176 to the cat-eye orifice 16 at an exit side 178 of the modified core tip structure 170. The illustrated streamlined interior passage 174 has a generally conical or converging geometry 180 along at least a substantial portion or at least most of the length of the streamlined interior passage 174 and the modified core tip structure 170 between the inlet and exit sides 176 and 178. In the illustrated embodiment, the streamlined interior passage 174 also includes a semi-spherical or concave geometry 182 at a tip portion 184 of the generally conical or converging geometry 180. Advantageously, the streamlined interior passage 174 substantially reduces the internal volume, thereby reducing the amount or likelihood of liquid retention inside the liquid spray tip 12. In turn, the reduced liquid retention reduces the likelihood of liquid dripping from the liquid spray tip 12 when the spray gun 10 is shut off or disassembled. Furthermore, the streamlined interior passage 174 reduces the likelihood of blockage within the liquid spray tip 10, and improves the uniformity of liquid flow and subsequent spray formation downstream from the cat-eye orifice 16. All of these factors improve the performance and serviceability of the spray device 10.

The exterior geometry of the modified core tip structure 170 also differs from the embodiment of FIG. 3. As illustrated in FIG. 4, the modified core tip structure 170 includes a first cylindrical portion 186 adjacent the inlet side 176, a stepped portion 188 leading to a second cylindrical portion 190, and a converging portion 192 extending from the second cylindrical portion 190 to a blunt or flat face 194 at the exit side 178. The converging portion 192 may have a semi-spherical or convex geometry, a flat wedge-shaped geometry, or any other suitable geometry leading to the blunt or flat face 194.

In contrast to the convex face 164 of the embodiment of FIG. 3, the blunt or flat face 194 of FIG. 4 may reduce time, reduce material costs, and increase accuracy and manufacturability associated with machining or generally creating the cat-eye orifice 16, thereby improving the spray generating performance of the cat-eye orifice 16. For example, the reduced material at the blunt or flat face 194 generally reduces the amount or time of machining to create the cat-eye orifice 16. In the illustrated embodiment, the cat-eye orifice 16 has a generally diverging geometry 196, such as a wedge-shaped or v-shaped channel, which facilitates spray formation downstream of the hard coated spray tip 12. In certain embodiments, the cat-eye orifice 16 may be manufactured by wire electrical discharge machining (EDM) as an advantage of the relatively softer first material of the core tip structure 170. However, any other suitable manufacturing techniques may be utilized to create the cat-eye orifice 16. Subsequently, the hard coating 172 may be applied about the internal and external surfaces of the modified core tip structure 170 via a suitable coating technique. For example, exemplary coating techniques may include plating, or thermal diffusion, or boronizing, or chemical vapor deposition (CVD), or physical vapor deposition (PVD), or combinations thereof.

FIGS. 5 and 6 further illustrate details of the cat-eye orifice 16 and the external geometry of the modified core tip structure 170 of FIG. 4 in accordance with certain embodiments of the present technique. Turning now to FIG. 5, this figure is a perspective view of the hard coated spray tip 12 as illustrated in FIG. 4, further illustrating the diverging geometry 196 of the cat-eye orifice 16 and the blunt or flat face 194 of the exit side 178. As illustrated in FIG. 5, the diverging geometry 196 of the cat-eye orifice 16 is generally formed as a v-shaped channel extending straight across the exit side 178 of the modified core tip structure 170, such that the diverging geometry 196 passes entirely across the blunt or flat face 194 and opposite sides of the converging portion 192.

Turning to FIG. 6, this figure illustrates a top view of the hard coated spray tip 12 as illustrated in FIGS. 4 and 5, further illustrating the cat-eye shaped geometry of the orifice 16 in accordance with certain embodiments of the present technique. As illustrated with reference to FIGS. 4 and 6, the cat-eye orifice 16 is disposed centrally within the diverging geometry 196 at the interface between the semi-spherical or concave geometry 182 of the streamlined interior passage 174 and the diverging geometry 196. However, in alternative embodiments, the orifice 16 may have other desirable geometries, such as circular, rectangular, oval, and so forth. In operation, the liquid exits from the cat-eye orifice 16 and expands outwardly along the diverging geometry 196, thereby causing liquid atomization in a generally flat spray pattern. In addition, as discussed above with reference to FIGS. 2 and 3, the air-assisted spray shaping head 116 may further shape the spray in the desire shape, e.g., a flat spray pattern. However, any other spray patterns are within the scope of the present technique.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A spray system, comprising:

a spray tip comprising:

a core structure made of a first material comprising a tool steel, wherein the core structure comprises a liquid passage extending to a liquid exit orifice, wherein the liquid exit orifice has a cat-eye shaped opening forming a diverging passage that gradually diverges in a downstream direction away from the liquid passage; and a wear resistant coating disposed about the core structure at least over the cat-eye shaped opening of the liquid exit orifice and the diverging passage, wherein the wear resistant coating comprises a second material relatively harder than the tool steel of the first material.

2. The spray system of claim 1, wherein the tool steel of the first material comprises a composition of about 1.4 to 1.6% carbon, about 0 to 0.6% manganese, about 0 to 0.6% silicon, about 11-13% chromium, about 0 to 0.3% nickel, about 0.7 to 1.2% molybdenum, and about 0 to 1.1% vanadium.

3. The spray system of claim 1, wherein the tool steel of the first material comprises a type A tool steel, or a type D tool steel, or a type H tool steel, or a type M tool steel, or a type S tool steel.

4. The spray system of claim 3, wherein the second material comprises titanium, chrome, or boron.

5. The spray system of claim 1, wherein the wear resistant coating comprises a thermal diffusion coating.

6. The spray system of claim 1, wherein the liquid passage comprises a converging passage that gradually converges in the downstream direction along at least a substantial portion of the core structure to the liquid exit orifice, and the wear resistant coating extends over the converging passage and the diverging passage.

7. The spray system of claim 1, wherein the diverging passage terminates at a downstream end of the spray tip, a converging portion extends on an exterior to the downstream end, the liquid exit orifice comprises the cat-eye shaped opening at an intersection of the downstream end and the diverging passage, and the wear resistant coating extends over the converging portion, the diverging passage, and the cat-eye shaped opening.

8. The spray system of claim 7, wherein the downstream end comprises a flat exterior surface and the converging portion, the flat exterior surface extends crosswise to the downstream direction, and the converging portion progressively converges in the downstream direction toward the flat exterior surface, wherein the cat-eye shaped opening is defined by the intersection of the diverging passage, the flat exterior surface, and the converging portion of the downstream end.

9. The spray system of claim 8, wherein the wear resistant coating completely covers an entirety of the core structure.

10. The spray system of claim 9, wherein the steel of the first material comprises a tool steel, and the second material of the wear resistant coating comprises titanium, chrome, or boron.

11. The spray system of claim 10, wherein the tool steel of the first material comprises a composition of about 1.4 to 1.6% carbon, about 0 to 0.6% manganese, about 0 to 0.6% silicon, about 11-13% chromium, about 0 to 0.3% nickel, about 0.7 to 1.2% molybdenum, and about 0 to 1.1% vanadium.

12. The spray system of claim 1, comprising a spray coating gun having the spray tip disposed in a head assembly, wherein the spray coating gun comprises a handle, a trigger, a liquid valve coupled to the trigger, and one or more liquid passages between the liquid valve and the spray tip.

13. The spray system of claim 1, wherein the wear resistant coating completely covers the core structure, the wear resistant coating comprises an interior coating portion that extends over an entire interior of the core structure, and the wear resistant coating comprises an exterior coating portion that extends over an entire exterior of the core structure.

14. The spray system of claim 1, wherein the second material of the wear resistant coating comprises a ceramic.

15. The spray system of claim 1, wherein the cat-eye shaped opening comprises a v-shaped opening.

16. A spray system, comprising:

a spray coating device, comprising:

a body having a handle and a trigger coupled to a liquid valve; and a head coupled to the body, wherein the head comprises a removable spray tip having a liquid passage extending to a liquid exit orifice, the removable spray tip comprises a wear resistant coating completely covering an entirety of an interior surface and an exterior surface of the removable spray tip, and the wear resistant coating has a substantially greater hardness characteristic than the removable spray tip.

17. The spray system of claim 16, wherein the wear resistance coating comprises titanium, chrome, or boron, and the removable spray tip comprises a tool steel.

18. The spray system of claim 16, wherein the liquid passage comprises a converging passage that gradually converges in a downstream direction along at least a substantial portion of the removable spray tip to the liquid exit orifice, the liquid exit orifice comprises a diverging passage that gradually diverges in the downstream direction away from the liquid passage, and the wear resistant coating extends over converging passage and the diverging passage.

19. The spray system of claim 18, wherein the converging passage and the diverging passage intersect with one another inside of the removable spray tip, the diverging passage terminates at a downstream end of the removable spray tip, the converging passage comprises a conical passage, the diverging passage comprises a V-shaped channel extending crosswise to the downstream direction, the liquid exit orifice comprises a cat-eye shaped opening at an intersection of the downstream end and the V-shaped channel, and the wear resistant coating extends over the conical passage, the V-shaped channel, and the cat-eye shaped opening.

20. The spray system of claim 19, wherein the liquid exit orifice comprises an electrical discharge machined (EDM) orifice in the removable spray tip, and the wear resistant coating comprises a vapor deposition coating disposed over the EDM orifice.

21. The spray system of claim 16, wherein the wear resistant coating comprises a plurality of layers each completely covering the entirety of the removable spray tip.

22. The spray system of claim 21, wherein the plurality of layers comprises a wear resistant layer and a chemical resistant layer.

23. The spray system of claim 21, wherein the plurality of layers comprises at least three layers each completely covering the entirety of the removable spray tip.

24. A method, comprising:

forming a liquid spray tip having an upstream opening, a downstream end portion, and an interior chamber that converges in a downstream direction from the upstream opening toward the downstream end portion;

forming a liquid exit orifice that diverges in the downstream direction from the interior chamber to the downstream end portion, wherein the liquid spray tip is made with a tool steel; and completely coating an entirety of the liquid spray tip with a wear resistant coating after forming the liquid spray tip and the liquid exit orifice, wherein the wear resistant coating is made with a material having a substantially greater hardness characteristic than the tool steel of the liquid spray tip.

25. The method of claim 24, wherein forming the liquid exit orifice comprises machining the liquid exit orifice, and completely coating comprises thermal diffusion coating or boronizing the liquid spray tip after machining of the liquid exit orifice.

* * * * *